(12) United States Patent
Baumann et al.

(10) Patent No.: US 6,815,012 B2
(45) Date of Patent: Nov. 9, 2004

(54) METHOD FOR PRODUCING A HIGH-QUALITY INSULATION FOR ELECTRIC CONDUCTORS OR CONDUCTOR BUNDLES OF ROTATING ELECTRICAL MACHINES BY MEANS OF THERMAL SPRAYING

(75) Inventors: Thomas Baumann, Wettingen (CH); Reinhard Fried, Nussbaumen (CH)

(73) Assignee: ALSTOM Technology LTD, Baden (CH)

( * ) Notice: Subject to any disclaimer, the term of this patent is extended or adjusted under 35 U.S.C. 154(b) by 0 days.

(21) Appl. No.: 10/168,129

(22) PCT Filed: Dec. 21, 2000

(86) PCT No.: PCT/CH00/00681

§ 371 (c)(1),
(2), (4) Date: Oct. 17, 2002

(87) PCT Pub. No.: WO01/48896

PCT Pub. Date: Jul. 5, 2001

(65) Prior Publication Data

US 2003/0113465 A1 Jun. 19, 2003

(30) Foreign Application Priority Data

Dec. 28, 1999 (DE) .......................... 199 63 492

(51) Int. Cl.$^7$ ............................................. C23C 4/16
(52) U.S. Cl. ..................... 427/447; 427/8; 427/118; 427/446; 427/299; 427/314; 427/398.1
(58) Field of Search ................... 427/447, 314, 427/407.1, 422, 425, 446, 8, 299, 118, 398.1

(56) References Cited

U.S. PATENT DOCUMENTS

| 3,747,853 A | 7/1973 | Kipple et al. |
| 5,316,801 A | 5/1994 | Hopeck |
| 5,650,031 A | 7/1997 | Bolon et al. |

FOREIGN PATENT DOCUMENTS

| DE | 31 39 954 A1 | * | 4/1983 | |
| DE | 3933745 A1 | | 4/1991 | ........... B05B/15/04 |
| DE | 4027892 A1 | | 4/1991 | |
| DE | 19701307 A1 | | 7/1998 | |
| DE | 19706851 A1 | | 9/1998 | |
| DE | 19860412 A1 | | 6/2000 | |
| EP | 0321223 A | | 6/1989 | |
| EP | 0660336 A2 | | 6/1995 | ............ H01B/3/04 |

OTHER PUBLICATIONS

Patent Abstracts of Japan, vol. 014, No. 045, (E–0880), Jan. 26, 1990 & JP 01 274648 A (Hitachi Ltd), Nov. 2, 1989, Zusammenfassung.

Wilden, J., et al., "Thermal Spraying", in *Modern Coating Processes*, pp. 3–17 (DGM Informationgesellschaft Verlag, 2d. ed., Dortmund, Germany, 1996).

Patent Abstracts of Japan, vol. 1999, No. 3, Mar. 31, 1999, & JP 10 314658 A (Sankyo Seiki Mfg Co Ltd), Dec. 2, 1998, Zusammenfassung.

Patent Abstracts of Japan, vol. 004, No. 121 (E–023), Aug. 27, 1980, & JP 55 074345 A (Nippon Denso Co Ltd), Jun. 4, 1980, Zusammenfassung.

Babiak, Z., "Flame Spraying", in *Modern Coating Processes*, pp. 45–56 (DGM Informationgesellschaft Verlag, 2d. ed., Dortmund, Germany, 1996).

Moebus, S., "High Velocity Flame Spraying", in *Modern Coating Processes*, pp. 57–96 (DGM Informationgesellschaft Verlag, 2d. ed., Dortmund, Germany, 1996).

* cited by examiner

Primary Examiner—Katherine A. Bareford
(74) Attorney, Agent, or Firm—Cermak & Kenealy LLP; Adam J. Cermak

(57) ABSTRACT

The process according to the invention discloses production of a high-quality insulation for conductors or conductor bundles. In this process, internal corona-discharge protection, insulation and external corona-discharge protection are all applied to the conductor or conductor bundle in successive steps by means of thermal spraying. The application thickness per spraying run is up to 0.2 mm, thus ensuring that the layer is free of defects and therefore avoiding partial discharges. Moreover, the ability to withstand thermal loads is considerably improved by the use of high-temperature plastics with fillers comprising inorganic materials as coating powder.

24 Claims, 4 Drawing Sheets

METHOD FOR PRODUCING A HIGH-QUALITY INSULATION FOR ELECTRIC CONDUCTORS OR CONDUCTOR BUNDLES OF ROTATING ELECTRICAL MACHINES BY MEANS OF THERMAL SPRAYING

This is a U.S. national stage application under 35 U.S.C. §371 of International application number PCT/CH00/00681, filed 21 Dec. 2000, and claims priority under 35 U.S.C. §§119, 365 to German application number 199 63 492.0, filed 28 Dec. 1999.

TECHNICAL FIELD

The invention relates to the field of the insulation of rotating electrical machines. In particular, the invention relates to a process for producing a high-quality insulation for conductors or conductor bundles as are used in rotating machines, for example in the form of stator coils, transposed bars and excitation conductors.

PRIOR ART

Various processes are customarily used in the field of insulation of conductors or conductor bundles of rotating electrical machines.

In one process, tapes comprising a glass-fiber support and mica paper are wound helically in layers onto a stator conductor until a desired insulation thickness is reached. Subsequent impregnation in epoxy resin displaces residual air from the insulating winding formed in this way, and the layers of tape are adhesively bonded. Curing in a suitable mold imparts the final shape to the insulation. For production reasons, in this process the mica platelets are oriented in the direction of the tape, which in the finished insulation results in the mica platelets being oriented parallel to the conductor surface.

According to a further process, which is known from EP 0 660 336 A2, tapes consisting of thermoplastic filled with mica are wound around stator conductors. Consolidation and shaping in this case take place by means of hot pressing of the stator conductor around which the tape has been wound, during which process air is displaced, the thermoplastic is melted and the layers of the winding are adhesively bonded. In this process too, the mica platelets are oriented parallel to the conductor surface.

Finally, the stator conductor can also be insulated by extrusion of thermoplastics without fillers, i.e. also without mica, as described in U.S. Pat. No. 5,650,031.

Nowadays, however, the conductors of rotating electrical machines which are to be insulated are generally structures of a very complex shape, in the form of bars or coils. A straight part of the conductors is located in the grooves of the stator of the machine. A curved part of the conductors, after suitable connection to adjacent bars and coils, forms a winding head which projects out of the stator at both ends. In the case of large rotating machines, the length of the straight part may exceed 6 m. A problem hitherto has been that insulation and conductor usually have different coefficients of thermal expansion $\alpha$ which, over the course of time, on account of thermal stresses, may lead to defects in the insulation as a result of cavities which form where the insulation becomes detached, and that defects, for example inclusions of air, are formed during the production of the insulation. Partial discharges may occur at such defects, leading to damage to the insulation. In this case too, partial discharge activities in the 100 nC range are quite customary.

In view of these partial discharge activities, hitherto it has only been possible for the machine insulation to operate reliably as a result of the barrier action of mica platelets oriented perpendicular to the field direction. This prevents the formation of flashover passages leading out of the cavities. 2.5 to 2.75 kV/mm is generally regarded as the upper limit for long-term reliability of the operating field strength. However, a maximum level such as this is exceeded, in some cases considerably, by other insulation systems used in medium- or high-voltage insulation.

For example, the maximum field for long-term operation in pin-type insulators, in which an alumina-filled epoxy resin is used for gas-insulated circuits, is 4 kV/mm, and the maximum field for high-voltage cables, in which polyethylene is used, is approx. 12 kV/mm. A common feature of these conventional insulation systems is that there are no partial discharges under operating load. However, application of these insulation systems for machine insulation is not possible for the application according to the invention, since in those cases the insulation is only subject to weak electrical loads and therefore freedom from defects in accordance with the invention is not of crucial importance, and consequently defects are acceptable in this case. Other conventional insulation techniques are not suitable for the demands imposed by the application according to the invention.

However, since, moreover, the conventional processes and materials using mica which are currently in use are substantially already more than thirty years old, at best incremental improvements are to be expected from any further developments to this prior art. Therefore, it appears highly unlikely that it will be possible to further develop this prior art to develop a higher-quality insulation which can be produced with shorter throughput times and lower manufacturing costs compared to the prior art, and also in an environmentally friendly production process, i.e. without the use of solvents, without emissions and without the production of special waste, and which does not include any defects or, if there are defects, these defects do not lead to any partial discharges.

SUMMARY OF THE INVENTION

Therefore, it is an object of the present invention to provide a process for producing a high-quality insulation for conductors or conductor bundles which is of a high quality and can be produced with short throughput times and low manufacturing costs and in an environmentally friendly fashion.

According to the invention this object can be achieved by processes for producing a high-quality insulation for conductors or conductor bundles as described herein.

This inventive process for producing a high-quality insulation for conductors or conductor bundles without defects which may lead to partial discharges under test and operating loads means that the oriented mica platelets are no longer required. This greatly facilitates both the choice of production processes and the choice of materials for the insulation, since for many polymers it is difficult to incorporate mica in concentrations of more than 40 percent by weight.

BRIEF DESCRIPTION OF THE DRAWING

The invention is explained in more detail below with reference to an exemplary embodiment which is illustrated in the drawing, in which.

WAY(S) OF CARRYING OUT THE INVENTION

Figure 1:
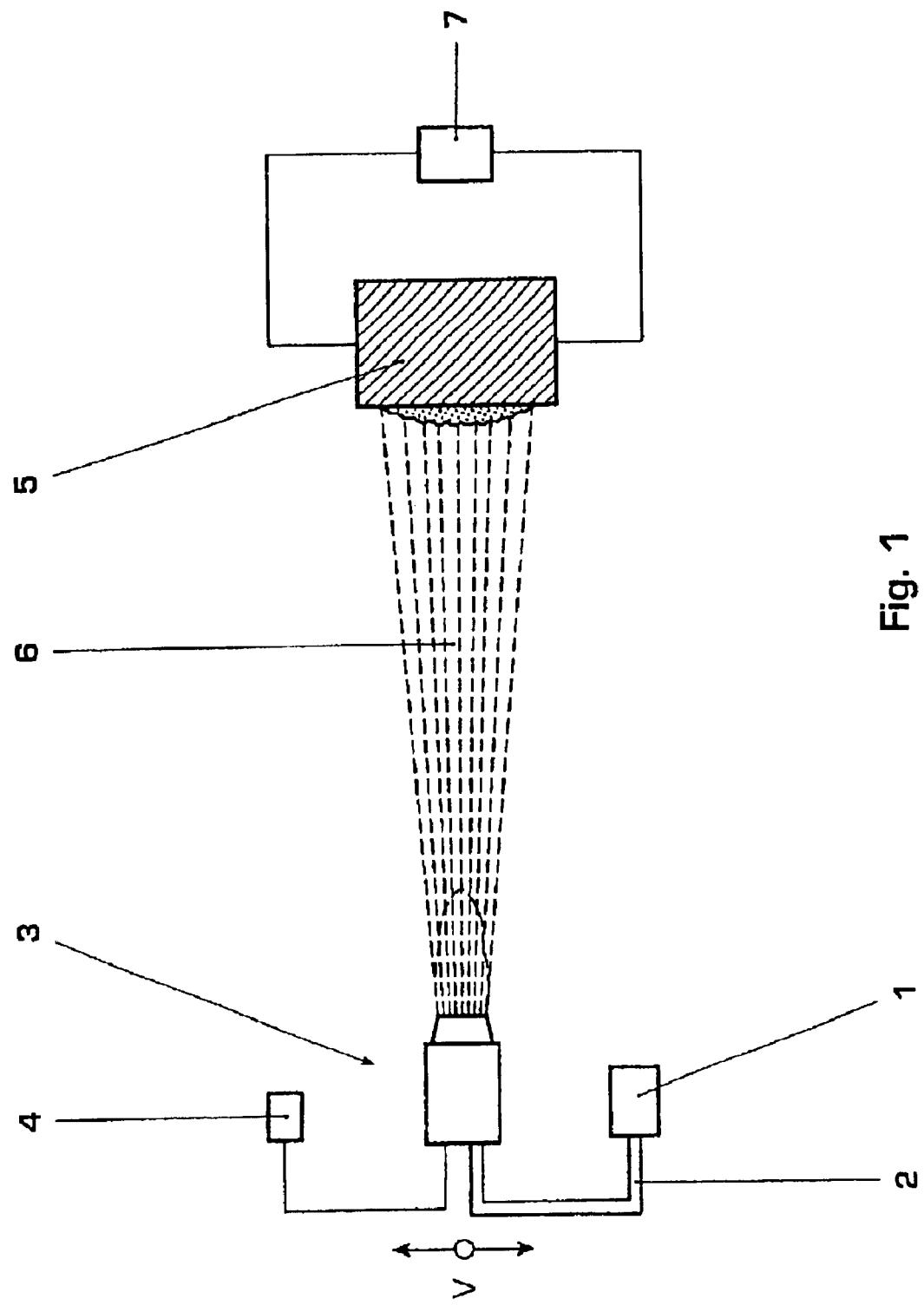
FIG. 1 shows a structure of the device for thermal spraying according to the invention.

The following text provides an extensive description of a process for producing a high-quality insulation for conductors or conductors bundles of rotating electrical machines. First of all, the basic structure of the insulation will be dealt with, and then the process according to the invention will be explained in detail.

The insulation which is applied using the process according to the invention comprises three layers. The first layer forms an internal corona-discharge protection, consisting of conductively or semiconductively filled polymer. In this case, a polymer which can be successfully joined to the polymer material of the insulating layer which follows it is used. It is preferable to use the same polymer as in the insulating layer.

As is the case in high-voltage cables, the internal corona-discharge protection has the role of decoupling electrical and mechanical boundary layers. In electrical terms, the internal corona-discharge protection has the same potential as the metallic conductor below it, i.e. is part of the electrical conductor; in mechanical terms, by contrast, it is part of the insulation. This ensures that any points where insulating sleeve and conductor become detached are free from partial discharges, since there is no voltage drop across the detachment.

The process according to the invention for the production of this high-quality insulation for conductors or conductor bundles is intended to satisfy the following demands:

1) The production process is to be substantially independent of the particular geometry of the initial bar or coil, i.e. of the transposed, uninsulated, consolidated bar or coil.
2) The insulation is to be of a high quality, i.e. compared to the prior art is to have an improved thermal stability up to approx. $T_{max}=180°$ C. and is to be able to withstand a maximum field for long-term operation of approx. 5 kV/mm without being damaged.
3) Furthermore, the process is to allow insulation of constant thickness with a tolerance $\Delta d/d<10\%$—even if the tolerances of the initial bar or coil are considerably greater— while it is to be possible to produce layer thicknesses of from 0.3 to 7 mm.
4) To shorten the production time, the throughput time per bar or coil is to be at most 1 to 3 hours.

In view of these demands which are to be satisfied by the process according to the invention, one could consider using conventional thermal spraying processes as the starting point.

Conventional thermal spraying processes of this type are disclosed, for example, in "Moderne Beschichtungsverfahren" [Modern coating processes], Chair of Materials Science, University of Dortmund, H. D. Steffens, DGM Informationsgesellschaft Verlag, 2nd edition, 1996. According to this article, thermal spraying according to DIN EN 657 encompasses processes in which spraying additives are (partially) melted (down) inside or outside spraying appliances and are discharged onto prepared surfaces. The application of a layer of spraying additives may take place in either the liquid or the plastic state. The layer thicknesses which can be achieved extend from about 10 $\mu$m up to a few millimeters. During the spraying, the substrate is generally subject to a low thermal load, with surface temperatures below 250° C., which can even be kept below 50° C. if the procedure is carried out in a suitable way. Consequently, there are scarcely any limits with regard to the possible combinations of substrate material and spraying additive.

A drawback of the conventional thermal spraying processes is that thermally sprayed layers which are produced by means of these processes have a characteristic structure which is attributable to the application process and can result in unfavorable properties. Reactions during and after the flight of the particles to the substrate, mechanical influences during solidification and temperature gradients through the various layers may result in a structure which is characterized by a large number of unstable and metastable states. Thermally sprayed layers often have a lamellar layer structure and, depending on the spraying process and spraying additive used, are more or less porous, heterogeneous, anisotropic and characterized by microcracks. In some cases, oxides or nitrides and spray particles which have not completely melted or have already cooled again before they come into contact with the substrate surface are incorporated in the layer. Furthermore, hitherto it has only been known to apply these processes for low-temperature plastics. Furthermore, the process has not hitherto been used for the production of multilayer structures in which the materials used for the various layers differ.

Figure 3:
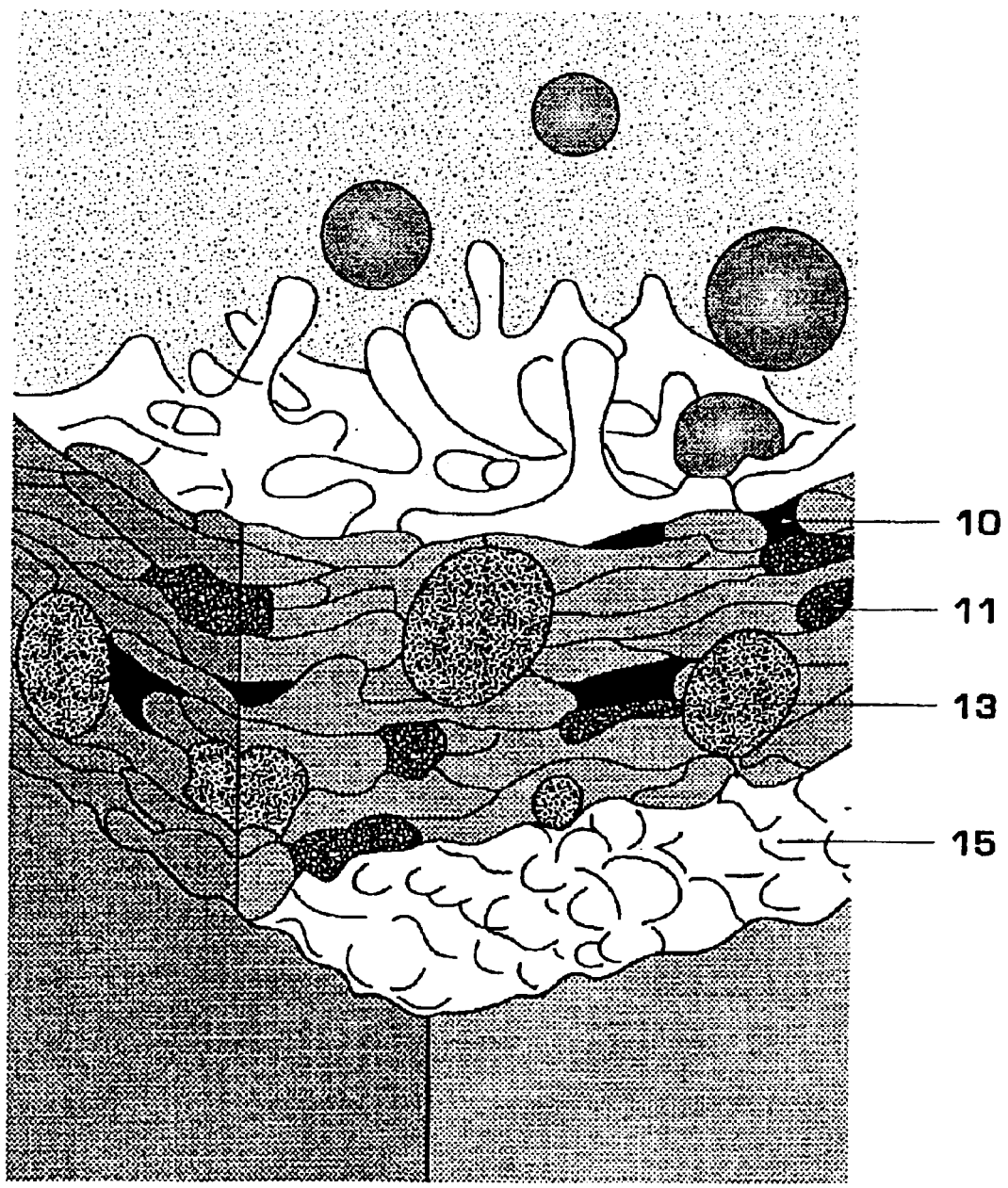
FIG. 3 shows a layer structure of a layer structure produced by means of a conventional thermal spraying technique.

FIG. 3 shows the formation of a thermally sprayed layer of this type, this layer including, on a substrate 15, cavities 10, oxidized particles 11 and unmelted particles 13. Moreover, these layers often have low levels of adhesion. Only after thermally sprayed layers have undergone further treatment by mechanical, thermal and thermomechanical processes can the layer properties, such as porosity, adhesion, hardness and ductility, as well as the internal stress state which is established, be significantly improved.

The advantage of thermal spraying over the coating techniques which have been used hitherto consists in the fact that the outlay on manufacturing technology is considerably lower and expensive special equipment, such as for example winding robots, vacuum/pressure vessels, devices for the cooled storage of liquid resin, etc., are not required and can be replaced by commercially available coating units and robots. Moreover, this technique can be automated to a much greater extent than the conventional process. The throughput times are shortened considerably, to only 0.5 to 3 h. Therefore, use of the thermal spraying process makes it possible to save on investment costs, reduce throughput times and achieve a high level of automation.

Therefore, in the process according to the invention, the conventional process of thermal spraying is developed in such a manner that, unlike in the prior art, it is possible to form conductor insulation including internal and external corona-discharge protection with layers without defects which could lead to partial discharges which are also able to withstand high temperatures without being damaged.

The materials used for the process according to the invention will briefly be dealt with first of all in the text which follows.

In the process according to the invention, unlike in the prior art, the spraying additives used are high-temperature plastics with fillers comprising inorganic materials. When these high-temperature plastics are being selected, it should be ensured that the materials are suitable for the thermal loads and are available in powder form or at least can be converted into powders with a suitable grain size distribution. A filling with inorganic fillers is in principle desirable in order to improve the creep rupture strength, to reduce the coefficient of thermal expansion and to improve the thermal conduction of the insulation. Examples of high-temperature plastics are, firstly, the known high-performance thermoplastics (polyether ether ketone (PEEK), polyetherimide (PEI), polyamide imide (PAI), polyimide (PI), polyphenylene sulfone (PPSU) polyethersulfone (PES), polyphenylene sulfide (PPS), polyphthalamide (PPA)) and also engineering thermoplastics which are able to withstand high temperatures, such as polyethylene terephthalate (PET), polyethylene naphthalate (PEN) and some polyamides (e.g. PA9, PA46, PPA). These engineering thermoplastics all have a melting point of over 230° C. and a heat distortion temperature of >200° C. Although in some cases the long-term use temperatures of the engineering thermoplastics listed are usually given as below 180° C., these temperatures are not of relevance for use as machine insulation. It is also possible to use thermosets which are suitable for high temperatures. The standard tests for determining these temperatures use the decrease in tensile strength as criterion for the mechanical strength at elevated temperatures. However, for machine insulation, tensile loads are relatively insignificant. The most important mechanical requirement is the avoidance of plastic creep under surface pressure, as exerted by securing elements, such as for example slot wedges, supports in the winding head, etc. Long-term creep tests under 5–10 times the load at 180° C. demonstrated that the engineering thermoplastics listed above, in the filled state, are well able to withstand such loads.

In addition to thermoplastics, it is also possible to use thermosets in the B state, i.e. materials which are not yet crosslinked and therefore are able to melt. For complete thermal crosslinking, they require a further thermal treatment. One possible advantage over the conventional method of applying thermosets as a layer, namely electrostatic spraying, consists in the fact that in the case of thermal spraying particles can be at a higher temperature than the surface of the bar. Consequently, these particles form a film of liquid with a lower viscosity than the viscosity which would correspond to the temperature of the surface of the bar. Since a sufficiently low viscosity is of importance for the film to have a smooth profile, it is therefore possible to achieve a good result even with moderately preheated bars.

With regard to fillers, it is possible to use the known inorganic materials. In this context, it is possible to apply fillers in fiber form, for example short fibers of E-glass or quartz glass, or granular fillers. In the case of fillers in fiber form, problems may arise with the delivery and lower application rates. However, this may be alleviated by a combination of granular or spherical fillers and fillers in fiber form.

The fillers do not necessarily have to be compounded into the polymer. Experience has shown that milling the compounded granules results in considerable phase separation, and consequently there is, in any case, a two-component filler/polymer blend. Furthermore, in the case of fiber-filled compounds, the milling considerably comminutes the fiber fillers, so that the fibers shortened in this way no longer produce any reinforcing action.

The following text describes the process according to the invention and the coating device according to the invention which is required for this process, for the insulation of conductors or conductor bundles, in more detail.

First of all, the structure of the coating device which is required to carry out the process according to the invention will be dealt with, as shown in FIG. 1.

The coating device comprises a powder reservoir 1 and a powder-delivery device 2. A high-temperature plastic as coating material in powder form is accommodated in the powder reservoir 1. The powder-delivery device 2 comprises a device for controlling a continuous powder discharge of the coating material originating from the powder reservoir 1.

Furthermore, the coating device comprises a spray gun 3 having a control 4 which is responsible, inter alia, for controlling the amount of coating material applied, the speed of movement v of the spray gun past the object 5 which is to be coated and the melting of the coating material 6 used. For the process according to the invention, of the possible processes for thermal spraying, namely laser spraying, melt-bath spraying, flame spraying, detonation spraying, high-speed flame spraying, arc spraying and plasma spraying, the use of a process with a high particle velocity is suitable.

Moreover, the coating device comprises a rod or coil rotation and holding device (not shown). This rod or coil rotation and holding device is used to hold the workpieces during the coating. Those parts of the workpieces which are not to be coated, i.e. the coil eyelets or bar eyelets, are used as the main holding points for the bar or coil rotation and holding device, rotation of the workpieces about the longitudinal axis simplifying the coating using a single robot. The rod or coil rotation and holding device is preferably operated as an additional axis of the robot.

In addition, the coating device has a rod or coil heater 7, which heats the workpiece during the coating. The purpose of this rod and coil heater 7 is to ensure that the liquid plastic particles which arrive remain in liquid form for a time, so that they run together to form a continuous, pore-free film. The temperatures required for this purpose are dependent to a considerable extent on the melt viscosity. It is simplest for the heating to be produced electrically, with either inductive or resistive heating being possible. In the case of inductive heating, the heating is effected by medium- or high-frequency coils which are arranged around the conductor, while resistive heating is effected by connecting the bar or coil to a DC or low voltage.

By way of example, for flame spraying or also as an alternative embodiment, the coating device additionally has a device (not shown) for monitoring the temperature at the coating location. This temperature-monitoring device is required, inter alia, since the flame heats the workpiece in addition to the electrical heating, or in the case of other coating processes, the surface temperature drops as the layer thickness increases. Since the temperature of the workpiece at the coating location should be significantly above the melting point of the coating material but not so high that the polymer is thermally degraded, this temperature monitoring is carried out. To optimally match the flame temperature and the electrical heating temperature to one another, in situ measurement of the surface temperature is carried out. Therefore, by way of example an IR measuring unit with a short integration time is used as temperature-monitoring device.

In addition to the devices which have been mentioned above and illustrated in FIG. 1, the coating device also has a spraying robot which executes and controls the movement of the spray gun past the workpiece which is to be coated, i.e. for example the bar or coil, and a soundproofing and dust cabinet for protecting the environment from disruptive noise and for protecting the coating which has been applied from contamination, for example by dust particles.

The process according to the invention for producing high-quality insulation for conductors or conductor bundles, which is carried out by means of the coating device described above, will now be described.

Figures 1, 2:
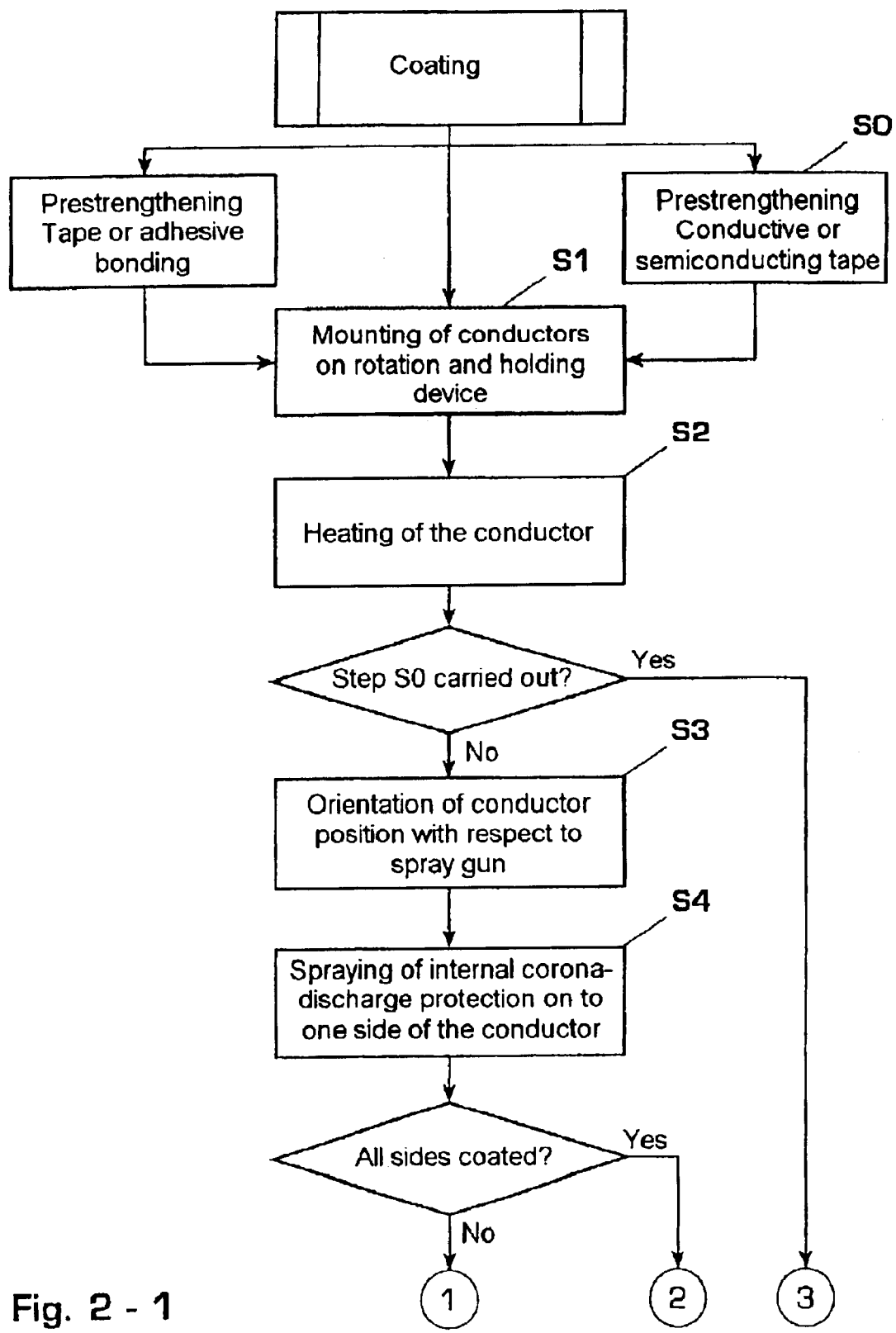
FIG. 2 shows a flow diagram which illustrates the way in which the process according to the invention is carried out.
Figure 2:
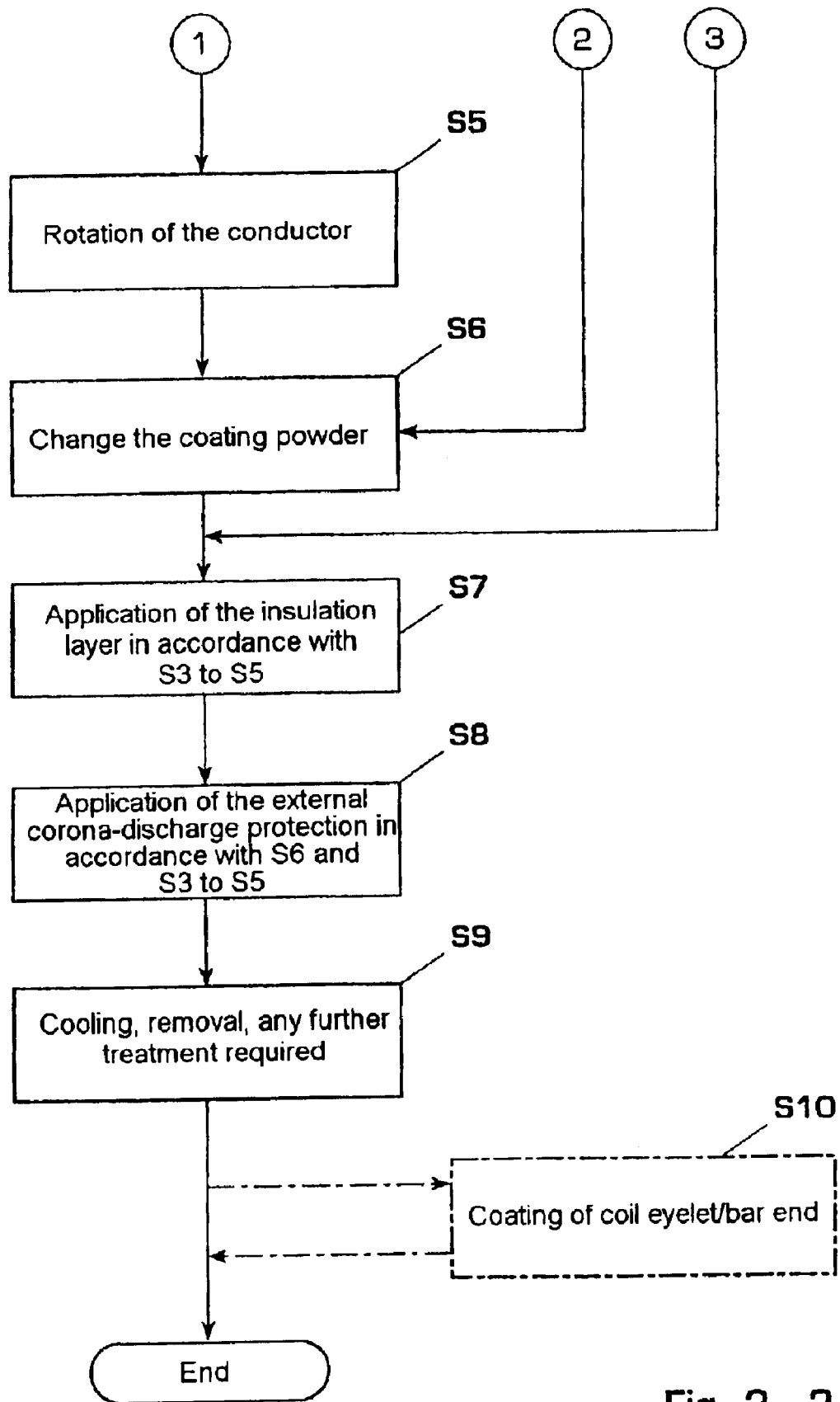

The process according to the invention is shown in FIG. 2 in the form of a flowchart and comprises the following steps:

1) Mounting of the bar or coil on a rotation and holding device:

In a first step S1, a bar or coil which is to be coated is mounted on a rotation and holding device, which is used to hold the bar or coil during the coating operation and to rotate the corresponding side of the bar or coil toward a spray gun. It is advantageous for the bar or coil to have been prestrengthened by internal adhesive bonding of the conductors or by winding a tape around them (step S0), since this ensures better and in particular more stable positioning on the rotation and holding device 4. In the case of relatively large objects, intermediate supports are additionally used in order to ensure stability of installation. The rotation of the rotation and holding device 4 is controlled by a control device of a spraying robot.

2) Connection of bar or coil to an electrical heater

In the following step S2, the bar or coil is connected to an electrical heater, either inductive or resistive, described above and is heated to the desired substrate temperature.

3) Orienting the bar or coil position with respect to the spray gun

Then, in step S3, the bar or coil position is oriented in order for spraying to commence. The corresponding rotation of the rotation and holding device 4 is controlled by the control device of the spraying robot, so that after the rotation has ended one of the flat sides of the bar or coil is oriented perpendicular with respect to the spray gun.

4) Spraying the internal corona-discharge protection

In the following, first actual coating step (step S4), the internal corona-discharge protection is applied in horizontal zigzag paths of suitable width. In the case of large objects which are to be coated, it is possible for a plurality of spray guns to be used simultaneously and controlled by the spraying robot. In the case of the large object, the intermediate supports automatically move away when a spray gun approaches, under the control of the control device of the spraying robot. The layer thickness is determined by the powder-delivery device and the speed at which the spray gun moves past the bar or coil which is to be coated, and can therefore be varied by the control device of the spraying robot. The spray thickness per spray pass is preferably 0.05 to 0.2 mm.

5) Rotation of bar or coil

After the coating of a flat side has ended, in step S5 the bar or coil is rotated by the rotation and holding device, this rotation being controlled by the control device of the spraying robot. The next side of the bar or coil which is to be coated is once again oriented perpendicular to the spray gun.

Then, the steps S3 and S4 which have been descried above are carried out for the further side of the coil. The same procedure is applied to the remaining sides of bar or coil which are to be coated. In the case of coils, the repetition also takes place for the other limb of the coil. However, if, in step S0, a strip which is provided with a conductive or semiconducting layer has been used to prestrengthen the bar or coil, steps S3 to S5 for the application of an internal corona-discharge protection are dispensed with, since this protection has already been formed by the tape.

In general, the coating thickness required for the internal corona-discharge protection can be applied in a single pass. If this is not the case, steps S3 to S5 are repeated.

6) Changing the coating powder

Following the complete coating of the bar or conductor with an internal corona-discharge protection, in step S6 either only the powder reservoir 1 or the entire spraying installation, including powder reservoir 1, powder-delivery device 2 and spray gun 3, for internal corona-discharge protection is changed for those required for the insulation layer.

7) Coating of bar or coil with the insulation layer

Following this change of coating material, the steps S3 to S5 which were described above for the coating with the internal corona-discharge protection are likewise carried out for the insulation layer (step S7). The coating material is in this case insulant-filled powder. The coating takes place in one or more passes until a desired insulation thickness has been reached. In this case, it may be necessary to readjust the substrate temperature by means of the control device of the spraying robot, since the temperature of the surface with which the liquid coating material comes into contact decreases as the thickness of the coating material increases unless the substrate temperature is readjusted.

Continuous recording of the surface temperature of the object which is to be coated is advantageous for this readjustment. By way of example, the surface temperature is continuously measured in the spraying spot by means of a "fast IR camera".

In this way it is possible, for example, to take account of the following factors which affect the surface temperature:

In the case of a long displacement travel L, the suction air cools the sprayed layer and the substrate excessively. Therefore, the layer material has to be held at a suitable temperature by the electrical heating, so that the appropriate temperature can be established at the spraying spot. Therefore, to monitor the surface temperature, a "slower IR camera" is additionally formed, so that the heating can be controlled reliably.

As the layer thickness grows, an appropriate surface temperature for production of the coating has to be maintained. This means that the substrate temperature would have to increase continuously. However, to avoid resulting overheating of the layer material which has already been applied or to prevent this material from flowing away, by way of example it would be possible to reduce the substrate temperature, so that the layer close to the substrate which has already been applied is solidified. If the conductor to be coated is a hollow conductor or waveguide, the cooling could, for example, be carried out from the inside by means of air. However, in the case of thicker conductors the high heat capacity could lead to the substrate cooling too slowly.

Depending on the geometric conditions and the layer thickness to be applied, after initial heating of the substrate to the appropriate substrate temperature, it may be necessary for the substrate to be heated further, to be cooled, for the surface to be preheated for each coating operation or for the spraying temperature to be changed by altering the supply of energy slightly.

In principle it remains the case that, the thicker the sprayed layer becomes, the less the surface temperature can be influenced by the substrate temperature, on account of the poor heat conduction. Therefore, a decreasing temperature gradient toward the substrate is desirable, i.e. the surface temperature has to be controlled increasingly from the coating side, either by heating with a flame or a radiator or by cooling with air. As a variation, the flame temperature can be controlled by influencing the flow of fuel gas.

In this context, on-line detection of the surface temperature of the layer which is applied directly in the spraying spot is particularly advantageous, since this makes it possible to prevent changes in parameters having adverse effects on the resulting layer. By way of example, as soon as the on-line spraying spot temperature measurement indicates a deviation from a predetermined set value which could have an adverse effect on the layer produced, the $H_2$ mass flow can be controlled during spraying of the layer in order to influence the supply of energy; by way of example, the $H_2$ mass flow is increased as soon as the temperature drops below a predetermined value, whereas it is reduced when the temperature exceeds the predetermined value. This adjustment takes place in steps. In this way, the desired process parameters can easily be maintained and therefore a uniform quality of the layer can be achieved.

8) Coating of bar or coil with an external corona-discharge protection

Following the coating with insulating material of a predetermined thickness, first of all step S6 (replacing the coating material for the insulation with the coating material for external corona-discharge protection) and then step S7 using the coating material to produce an external corona-discharge protection are repeated. In this case, the coating material for the external corona-discharge protection consists of a conductively filled polymer.

9) Concluding step:

In a final step S9, which follows the coating of a bar or the coil, the coating is allowed to cool, and then the bar or coil is removed from the rotation and holding device. If appropriate, further processing or heat treatment of the surface is then carried out, in order to reduce thermal stresses between the bar or coil surface, for example consisting of copper, and the insulation. In the case of coating with thermosets, this makes it possible to achieve post-curing.

Furthermore, in an additional step S10, the bar ends or coil eyelets, which were used as holding points for the rotation and holding device during the preceding coating, can then be coated before the coating operation ends.

Therefore, the process according to the invention and the device according to the invention make it possible, in a simple manner and without the need for additional special tools and devices, to produce an insulation for bars or coils which is less expensive than the prior art and has an improved resistance to partial discharges on account of the absence of defects in the insulation.

To summarize, the process according to the invention discloses the production of a high-quality insulation for conductors or conductor bundles. In this process, internal corona-discharge protection, insulation and external corona-discharge protection are all applied to the conductor or conductor bundle in successive steps by means of thermal spraying. The application thickness per spray pass is up to 0.2 mm, which ensures that the layer is free of defects and therefore that partial discharges are avoided. Moreover, the ability to withstand thermal loads is significantly improved by the use of high-performance thermoplastics, engineering thermoplastics which are capable of withstanding high temperature and high-temperature thermosets.

What is claimed is:

1. A process for producing a high-quality insulation for conductors or conductor bundles, comprising the steps of:
   (S1) mounting a conductor or conductor bundle which is to be coated on a rotation and holding device;
   (S2) heating the conductor or conductor bundle to a predetermined substrate temperature;
   (S3) orienting the conductor or conductor bundle position with a flat side perpendicular with respect to a spray gun;
   (S4) thermal spraying a liquid or plastic internal corona-discharge protection onto the heated substrate from a coating powder, the application layer thickness being approximately 0.05 to 0.2 mm,
   (S5) rotating the conductor or conductor bundle, so that a further flat side of the conductor or conductor bundle is oriented perpendicular to the spray gun, and then a repeating steps S3 and S4 and repeating this step S5 until all the sides of the conductor or conductor bundle have been coated;
   (S6) changing the coating powder into an insulant-filled powder;
   (S7) coating the conductor or conductor bundle with the insulant-filled powder in at least one pass on all sides of the conductor or conductor bundle as described in steps S3 to S5;
   (S8) carrying out steps S6 and S7 using a coating powder for an external corona-discharge protection; and
   (S9) cooling the coated conductor or conductor bundle and removing it from the rotation and holding device.

2. The process as claimed in claim 1, wherein the conductor or conductor bundle comprises a conductor bar, a transposed bar, or a coil.

3. The process as claimed in claim 1, further comprising:
   (S0) prestrengthening the conductor or conductor bundle by internal adhesive bonding of the conductors or by winding a tape around said conductor or conductor bundle.

4. The process as claimed in claim 1, wherein said coating powder comprises high-temperature plastics with fillers comprising inorganic material.

5. The process as claimed in claim 4, wherein said high-temperature plastics comprise high-performance thermoplastics selected from the group consisting of polyether ether ketone (PEEK), polyetherimide (PEI), polyamide imide (PAI), polyimide (PI), polyphenylene sulfone (PPSU), polyethersulfone (PES), polyphenylene sulfide (PSU), polyphenylene sulfide (PPS), and polyphthalamide (PPA), or engineering thermoplastics.

6. The process as claimed in claim 5, wherein said engineering thermoplastics are selected from the group consisting of polyethylene terephthalate (PET), polyethylene naphthalate (PEN), and polyamides.

7. The process as claimed in claim 6, wherein said polyamides are selected from the group consisting of PA9, PA46, and PPA.

8. The process as claimed in claim 4, wherein said high-temperature plastics comprise high-temperature thermosets.

9. The process as claimed in claim 1, comprising:
   applying different layer thicknesses to different sides of the conductors or conductor bundles in at least one of steps S3, S4, S5, S7, and S8.

10. The process as claimed in claim 1, wherein S2 heating of the substrate comprises electrical heating.

11. The process as claimed in claim 10, wherein electrical heating comprises induction electrical heating or resistance electrical heating.

12. The process as claimed in claim 1, wherein S3 orienting comprises controlling the orientation of the conductor or conductor bundle with a control device of a spraying robot.

13. The process as claimed in claim 1, further comprising:

operating a plurality of spray guns simultaneously when said conductor of conductor bundle comprises a large conductor or conductor bundle.

14. The process as claimed in claim 1, wherein S1 mounting comprises mounting with intermediate supports when said conductors or conductor bundles comprise large conductors or conductor bundles, to ensure reliable positioning.

15. The process as claimed in claim 14, further comprising:

moving away said intermediate supports automatically under the control of a control device of a spraying robot when said spray gun approaches said intermediate supports.

16. The process as claimed in claim 1, comprising:

controlling an applied layer thickness with a control device of a spraying robot, said controlling comprising controlling a powder-delivery device and a speed of movement of the spray gun.

17. The process as claimed in claim 1, wherein S5 rotating comprises rotating the conductor or conductor bundle so that a further flat side of the conductor or conductor bundle is oriented perpendicular to the spray gun.

18. The process as claimed in claim 1, wherein S6 changing the coating powder comprises changing either by exchanging a powder reservoir or exchanging an entire spraying installation including a powder reservoir, a powder-delivery device, and a spray gun.

19. The process as claimed in claim 1, wherein S7 changing and coating comprises:

monitoring a surface temperature without contact; and readjusting the substrate temperature in response to a recorded surface temperature.

20. The process as claimed in claim 1, further comprising:

after coating the conductor or conductor bundle has ended and after removal of the conductor or conductor bundle from the rotation and holding device, coating bar ends or coil eyelets which have been used as holding points for the rotation and holding device.

21. The process as claimed in claim 1, comprising:

when a relatively large layer thickness has been applied to the conductor or the conductor bundle, cooling the layers close to the substrate and outside spraying spot so that said layers solidify and no longer flow away.

22. The process as claimed in claim 1, wherein said coating powder for an external corona-discharge protection comprises a conductively filled powder.

23. The process as claimed in claim 1, wherein S9 cooling comprises allowing the coated conductor or conductor bundle to cool.

24. A for producing a high-quality insulation for conductors or conductor bundles, comprising the steps of:

(S1) prestrengthening the conductor or conductor bundle by winding a tape around said conductor or conductor bundle, said tape comprising a conductive or semiconductive layer;

(S2) mounting a conductor or conductor bundle which is to be coated on a rotation and holding device;

(S3) heating the conductor or conductor bundle to a predetermined substrate temperature;

(S4) thermal spraying a liquid or plastic internal corona-discharge protection onto the heated substrate from a coating powder, the application layer thickness being approximately 0.05 to 0.2 mm, (S5) changing the coating powder into an insulant-filled powder;

(S6) coating the conductor or conductor bundle with the insulant-filled powder in at least one pass on all sides of the conductor or conductor bundle as described in step S4;

(S7) carrying out steps S5 and S6 using a coating powder for an external corona-discharge protection; and (S8) cooling the coated conductor or conductor bundle and removing it from the rotation and holding device.

* * * * *